United States Patent
Burnett et al.

(10) Patent No.: US 10,802,001 B2
(45) Date of Patent: Oct. 13, 2020

(54) ONLINE DILUTION FOR A LIQUID CHROMATOGRAPHY SYSTEM USING A SAMPLE METERING PUMP

(71) Applicant: Waters Technologies Corporation, Milford, MA (US)

(72) Inventors: Joshua A. Burnett, Taunton, MA (US); John M. Auclair, Seekonk, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 238 days.

(21) Appl. No.: 16/007,299

(22) Filed: Jun. 13, 2018

(65) Prior Publication Data

US 2018/0364203 A1 Dec. 20, 2018

Related U.S. Application Data

(60) Provisional application No. 62/521,826, filed on Jun. 19, 2017.

(51) Int. Cl.
*G01N 30/20* (2006.01)
*G01N 30/06* (2006.01)
(Continued)

(52) U.S. Cl.
CPC .............. *G01N 30/20* (2013.01); *G01N 1/38* (2013.01); *G01N 30/06* (2013.01); *G01N 30/34* (2013.01);
(Continued)

(58) Field of Classification Search
CPC ........ G01N 30/20; G01N 30/06; G01N 30/34; G01N 1/38
(Continued)

(56) References Cited

U.S. PATENT DOCUMENTS 6,382,035 B1 * 5/2002 Nichols ................. G01N 30/20
73/863.72
9,551,329 B2 1/2017 Cormier et al.
(Continued)

OTHER PUBLICATIONS

International Preliminary Report on Patentability in PCT/US2018/037254 dated Jan. 2, 2020; 9 pages.
(Continued)

*Primary Examiner* — John Fitzgerald
*Assistant Examiner* — Rodney T Frank
(74) *Attorney, Agent, or Firm* — Schmeiser, Olsen & Watts LLP; William G. Guerin

(57) ABSTRACT

An apparatus for diluting a sample in a liquid chromatography system includes a metering pump, a sample needle and a sample valve. One of the sample valve ports is in fluid communication with the first pump port, a second one of the sample valve ports is in fluid communication with the second pump port, and a third one of the sample valve ports is in fluid communication with the sample needle. The sample valve can be configured in a first to conduct a solvent to the first pump port and to fluidically terminate the second pump port, and in a second state in which the sample needle is in fluid communication with the second pump port. A merge valve configurable in different states is in fluid communication with the sample valve. The states of the sample valve and merge valve can be controlled to perform online dilution.

13 Claims, 7 Drawing Sheets

(51) Int. Cl.
  *G01N 1/38* (2006.01)
  *G01N 30/34* (2006.01)
  *G01N 30/02* (2006.01)
  *G01N 35/10* (2006.01)

(52) U.S. Cl.
  CPC ... *G01N 35/1097* (2013.01); *G01N 2001/383* (2013.01); *G01N 2030/027* (2013.01); *G01N 2030/202* (2013.01); *G01N 2030/347* (2013.01)

(58) Field of Classification Search
  USPC .................................................. 73/61.56
  See application file for complete search history.

(56) References Cited

U.S. PATENT DOCUMENTS

| | | |
|---|---|---|
| 9,816,971 B2 | 11/2017 | Jackson et al. |
| 9,823,225 B2 | 11/2017 | Cormier et al. |
| 2007/0062875 A1* | 3/2007 | Usowicz .................. G01N 1/14 210/659 |
| 2015/0316516 A1* | 11/2015 | Albrecht, Jr. .......... G01N 30/20 73/61.56 |
| 2016/0054274 A1 | 2/2016 | Cormier et al. |
| 2016/0077060 A1 | 3/2016 | Cormier et al. |
| 2016/0187304 A1* | 6/2016 | Wikfors ................... G01N 1/28 73/863 |

OTHER PUBLICATIONS

International Search Report and Written Opinion in PCT/US18/37254 dated Aug. 28, 2018; 14 pages.

\* cited by examiner

ONLINE DILUTION FOR A LIQUID CHROMATOGRAPHY SYSTEM USING A SAMPLE METERING PUMP

RELATED APPLICATION

This application claims the benefit of the earlier filing date of U.S. Provisional Patent Application No. 62/521,826, filed Jun. 19, 2017 and titled "Online Dilution for a Liquid Chromatography System Using a Sample Metering Pump," the entirety of which is incorporated herein by reference.

FIELD OF THE INVENTION

The invention relates generally to liquid chromatography systems. More particularly, the invention relates to an apparatus for controlled dilution of a sample during injection of the sample into a mobile phase of a liquid chromatography system.

BACKGROUND

High performance liquid chromatography (HPLC) and ultra-performance liquid chromatography (UPLC®) systems typically include a pump for delivering a fluid (the "mobile phase") at a controlled flow rate and composition, an injector to introduce a sample solution into the flowing mobile phase, a chromatographic column that contains a packing material or sorbent (the "stationary phase"), and a detector to detect the presence and amount of the sample components in the mobile phase leaving the column. When the mobile phase passes through the stationary phase, each component of the sample typically emerges from the column at a different time because different components in the sample typically have different affinities for the packing material. The presence of a particular component in the mobile phase exiting the column is detected by measuring changes in a physical or chemical property of the eluent. By plotting the detector signal as a function of time, chromatographic "peaks" corresponding to the presence and quantities of the components of the sample can be observed.

HPLC and UPLC® systems often require that the sample in the system flow at the chromatography column be diluted because the solvent used to dilute the sample prior to injection into the mobile phase may interfere with the ability to obtain a desired chromatographic resolution. Generally, it is preferable to keep the sample focused at the head of the chromatographic column; however, strong solvents can limit the retention of the sample and instead promote the release of the sample as it enters the column. In some separations, the result may be distortion of the chromatographic peaks, for example, two chromatographic peaks may be observed or the sample may simply flow with the solvent through the chromatographic column.

Dilutions can be performed manually by a skilled technician; however, the possibility of human error exists and it is not always practical for a technician to be available to perform dilutions. In some instances, the technician and equipment used to perform the dilution are located an inconvenient distance from the chromatography system. Significant delay can occur if the sample is transferred to a remote location for dilution, potentially resulting in processing downtime and an additional inconvenience of tracking the transported same may be required.

SUMMARY

In one aspect, the invention features an apparatus for diluting a sample in a liquid chromatography system. The apparatus includes a metering pump, a sample needle and a sample valve. The metering pump has a first pump port and a second pump port. The sample needle has a fluid channel. The sample valve has a plurality of sample valve ports. A first one of the sample valve ports is in fluid communication with the first pump port, a second one of the sample valve ports is in fluid communication with the second pump port, and a third one of the sample valve ports is in fluid communication with the sample needle. The sample valve is operable in one of a first state and a second state, wherein, when the sample valve is in the first state, the sample valve is configured to conduct a solvent to the first pump port and to fluidically terminate the second pump port, and wherein, when the sample valve is in the second state, the second one of the sample valve ports is in fluid communication with the third one of the sample valve ports so that the sample needle is in fluid communication with the second pump port.

The metering pump can be a positive displacement pump and the sample valve can be a rotary shear seal valve. The sample valve may have six or more sample valve ports.

The apparatus can include a solvent reservoir in fluid communication with one of the sample valve ports. The apparatus can include a pressure transducer disposed in a fluid path between the second pump port and the second one of the sample valve ports. The apparatus can include a valve control module in communication with the sample valve.

In some embodiments, when the sample valve is in the first state, a first sample valve port is in internal fluid communication with a sixth sample valve port, a second sample valve port is in internal fluid communication with a third sample valve port and a fourth sample valve port is in internal fluid communication with a fifth sample valve port, and when the sample valve is in the second state, the first sample valve port is in internal fluid communication with the second sample valve port, the third sample valve port is in internal fluid communication with the fourth sample valve port and the fifth sample valve port is in internal fluid communication with the sixth sample valve port.

The apparatus can include a merge valve in fluid communication with the sample valve and can include at least one valve control module in communication with the sample valve and the merge valve. The merge valve can have a plurality of merge valve ports and be operable in one of a first state and a second state, wherein, when the merge valve is in the first state, a first one of the merge valve ports is in fluid communication with a second one of the merge valve ports and wherein, when the merge valve is in the second state, the first one of the merge valve ports is in fluid communication with the second one of the merge valve ports and the third one of the merge valve ports. The merge valve may have six or more merge valve ports.

In some embodiments, when the merge valve is in the first state, a second merge valve port is in internal fluid communication with a third merge valve port, and a fourth merge valve port, a fifth merge valve port and a sixth merge valve port are in internal fluid communication with each other, and wherein, when the merge valve is in the second state, a first merge valve port, the second merge valve port and the third merge valve port are in internal fluid communication with each other and the fifth merge valve port is in internal fluid communication with the sixth merge valve port.

The merge valve can be operable in a third state wherein, when the merge valve is in the third state, the first merge valve port is in internal fluid communication with the second merge valve port, and the third merge valve port, the fourth merge valve port and the fifth merge valve port are in internal fluid communication with each other.

In another aspect, the invention features a chromatography system for online sample dilution. The chromatography system includes a metering pump, a pressure transducer, a sample needle, a solvent reservoir and a sample valve. The metering pump has a first pump port and a second pump port. The pressure transducer is in fluid communication with the second pump port of the metering pump. The sample needle has a fluid channel. The sample valve has a plurality of sample valve ports. A first one of the sample valve ports is in fluid communication with the first pump port, a second one of the sample valve ports is in fluid communication with the pressure transducer, and a third one of the sample valve ports is in fluid communication with the sample needle. The sample valve is operable in one of a first state and a second state, wherein, when the sample valve is in the first state, the sample valve is configured to conduct a solvent to the first pump port and to fluidically terminate the second pump port, and wherein, when the sample valve is in the second state, the second one of the sample valve ports is in fluid communication with the third one of the sample valve ports so that the sample needle is in fluid communication with the second pump port through the pressure transducer.

The chromatography system can include a merge valve in fluid communication with the sample valve. The merge valve can have a plurality of merge valve ports and be operable in one of a first state and a second state, wherein, when the merge valve is in the first state, a first one of the merge valve ports is in fluid communication with a second one of the merge valve ports and wherein, when the merge valve is in the second state, the first one of the merge valve ports is in fluid communication with the second one of the merge valve ports and the third one of the merge valve ports.

BRIEF DESCRIPTION OF THE DRAWINGS

The above and further advantages of this invention may be better understood by referring to the following description in conjunction with the accompanying drawings, in which like reference numerals indicate like elements and features in the various figures. It is to be understood that terms such as above, below, upper, lower, left, leftmost, right, rightmost, top, bottom, front, and rear are relative terms used for purposes of simplifying the description of features as shown in the figures, and are not used to impose any limitation on the structure or use of embodiments described herein. For clarity, not every element may be labeled in every figure. The drawings are not necessarily to scale, emphasis instead being placed upon illustrating the principles of the invention.

DETAILED DESCRIPTION

Figure 1:
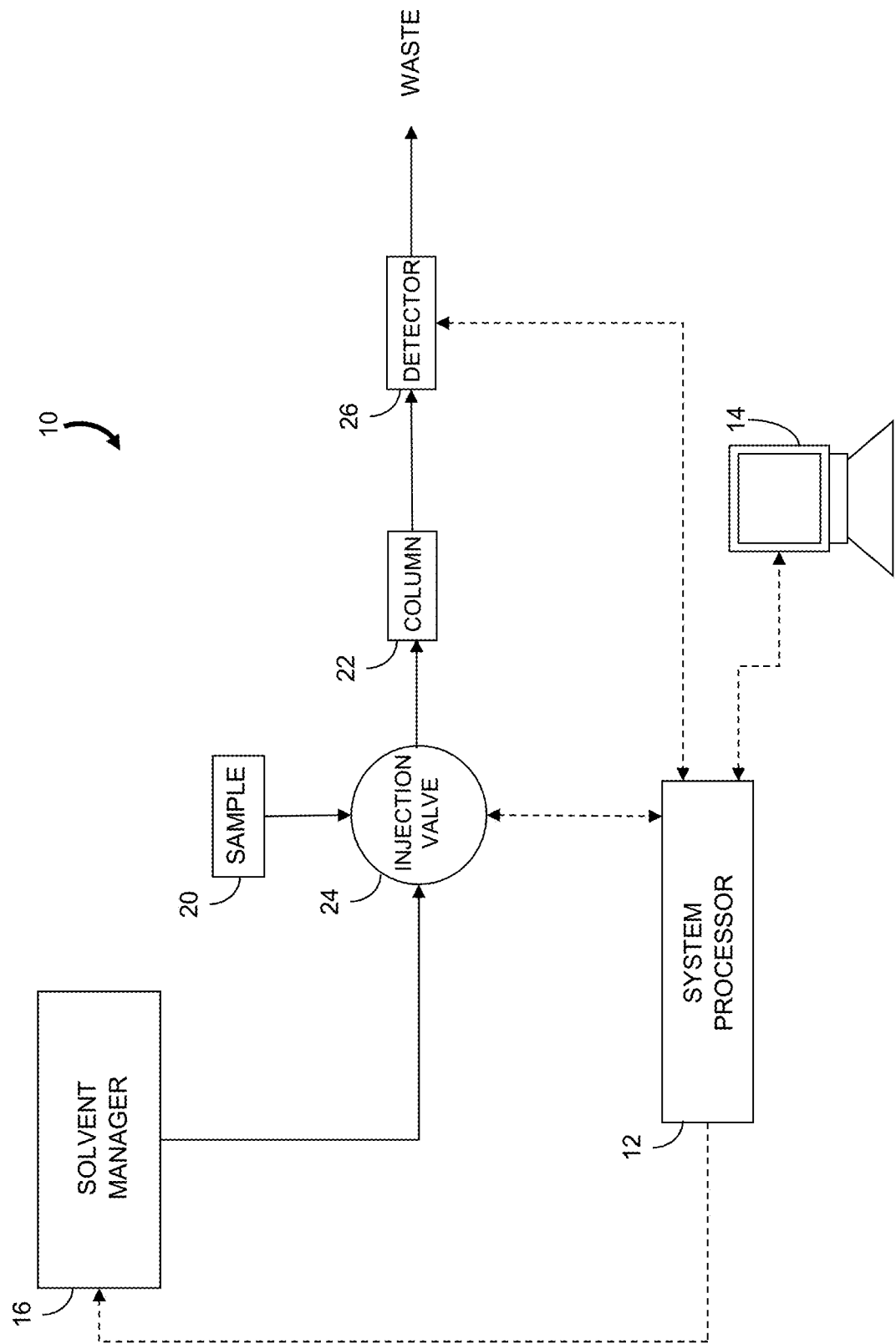
FIG. 1 is a high-level block diagram of a liquid chromatography system.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The terms "first," "second," "third" and the like in the description and in the claims, if any, are used for distinguishing between similar elements and not necessarily for describing a particular sequential or chronological order. It should be understood that the terms used in this manner are interchangeable under appropriate circumstances such that the embodiments described herein are, for example, capable of operation in sequences other than those illustrated or described herein. Furthermore, the terms "include" and "have," and any variations thereof, are intended to cover a non-exclusive inclusion, such that a process, method, system, article, device, or apparatus that comprises a list of elements is not necessarily limited to those elements, but might include other elements not expressly listed or inherent to such process, method, system, article, device or apparatus.

As used herein, a solvent is sometimes referred to as a "strong solvent" or a "weak solvent" to indicate the relative elution strength of the solvent with respect to one or more other solvents. If the mobile phase is a strong solvent, the sample dissolved in the strong solvent will have a greater affinity for the mobile phase than the stationary phase. A strong solvent is generally capable of dissolving a greater quantity of a sample than a weak solvent; however, with the use of a strong solvent there may be a shorter retention time and little or no retention of the sample on the stationary phase. In contrast, if the mobile phase is a weak solvent, the sample dissolved in the weak solvent generally has a greater affinity for the stationary phase than the mobile phase. As a result, sample components are better retained on the stationary phase and have longer retention times. By way of non-limiting examples for reversed phase chromatography, solvents composed primarily of methanol, acetonitrile, ethanol, isopropanol or tetrahydrofuran are typically considered strong solvents whereas water is generally considered a weak solvent. By way of non-limiting examples for normal phase chromatography and supercritical fluid chromatography, hexane and heptane are generally considered weak solvents, and methanol, ethanol and water are typically considered strong solvents.

In order for the stationary phase in the chromatographic column to preferentially retain sample components, the mobile phase is initially composed of a weak solvent of sufficiently low or moderate strength to prevent the sample components from simply passing through the column with little or no retention or separation. A gradient mobile phase gradually increases in solvent strength over time to elute the sample components at different times.

In various applications, the sample may be provided in a solution that includes a strong solvent which may interfere with retention of the sample components on the stationary phase. To enable the sample components to be retained, or "focused," at the head of the chromatographic column, it is often desirable to dilute the sample solution with a weaker solvent although the volume of the diluted sample is thereby increased. The "dilution ratio," as used herein, describes the degree, or amount, of the dilution and means a unit volume contribution of the sample with respect to the number of unit volumes contributed by one or more diluents.

Online dilution, sometimes called "at-column dilution," is achieved upstream from the chromatographic column generally at the location of injection of the sample into the mobile phase. This process allows for the injected sample to be mixed with, and therefore diluted by, the concurrently-flowing mobile phase. However, this dilution process typically requires a dedicated pump or high pressure syringe and a valve module. Patent Publication No. US 2016/0069844, the disclosure of which is incorporated herein by reference in its entirety, describes examples of systems using this process. These extra components result in increased system cost and require additional space. Moreover, the complications imposed during system setup present additional difficulties to users. One such complication is the need for a user to predefine a synchronized operation of the dedicated pump and the system pump so that the system flow through the chromatographic column remains constant.

In brief overview, embodiments of an apparatus for diluting a sample in a liquid chromatography system include a metering pump, a sample needle and a sample valve having multiple sample valve ports. A first one of the sample valve ports is in fluid communication with the first pump port, a second one of the sample valve ports is in fluid communication with the second pump port, and a third one of the sample valve ports is in fluid communication with the sample needle. The sample valve can be configured in at least a first state and a second state. When configured in the first state, the sample valve conducts a solvent to the first pump port and fluidically terminates the second pump port. When configured in the second state, the second one of the sample valve ports is in fluid communication with the third one of the sample valve ports so that the sample needle is in fluid communication with the second pump port. A merge valve that is configurable in a number of states is in fluid communication with the sample valve. The valve states of the sample valve and merge valve can be controlled to perform online dilution.

The various embodiments of the apparatus described below advantageously only utilize two high pressure valves. Consequently, the delay volume is reduced in comparison to systems employing greater numbers of valves to route the flush solvent, sample and mobile phase, and the cost of the chromatography system may be reduced accordingly. Other advantages include the elimination of the need for a separate tee to merge the sample and the mobile phase, and the ability of the metering pump to aspirate the sample into the apparatus at atmospheric pressure and dispense the aspirated sample into the mobile phase flow at full system pressure, for example, greater than 18,000 psi (125 MPa). A further advantage is the ability to control both the mobile phase flow rate and the dispensed sample flow rate so that the system flow rate at the column remains unchanged.

Relative to systems that do not have dilution capability, typical liquid chromatography systems that perform online dilution exhibit additional dispersion when the dilution feature is not used. When not operated in the dilution mode, the apparatus described herein yields chromatographic results that are similar to conventional chromatography systems without dilution. The apparatus can be easily switched, by valve state reconfiguration, between dilution and no dilution modes without incurring a performance penalty and without the need to otherwise physically reconfigure the chromatography system.

FIG. 1 is a block diagram of a conventional liquid chromatography system 10. The system 10 includes a system processor 12 (e.g., microprocessor and controller) in communication with a user interface device 14 for receiving input parameters and displaying system information to an operator. The system processor 12 communicates with a solvent manager 16 which provides a single solvent or a combination of solvents as a mobile phase. For example, the solvent manager 16 may be capable of supplying an isocratic mobile phase and a gradient mobile phase. A sample from a sample source 20 is injected into the mobile phase upstream from a chromatographic column 22 at an injection valve 24. The sample source 20 can be a sample reservoir such as a vial or other container that holds a volume of the sample solution. The chromatographic column 22 is coupled to a detector 26 which provides a signal to the system processor 12 that is responsive to various components detected in the eluent from the column 22. After passing through the detector 26, the system flow may exit through a waste port. Alternatively, the system 10 may include a diverter valve (not shown) to receive the system flow from the detector 26. The diverter valve can be used as part of a fraction collection process in which the diverter valve diverts each separated sample component in the system flow to a corresponding collection vessel.

Figure 2:
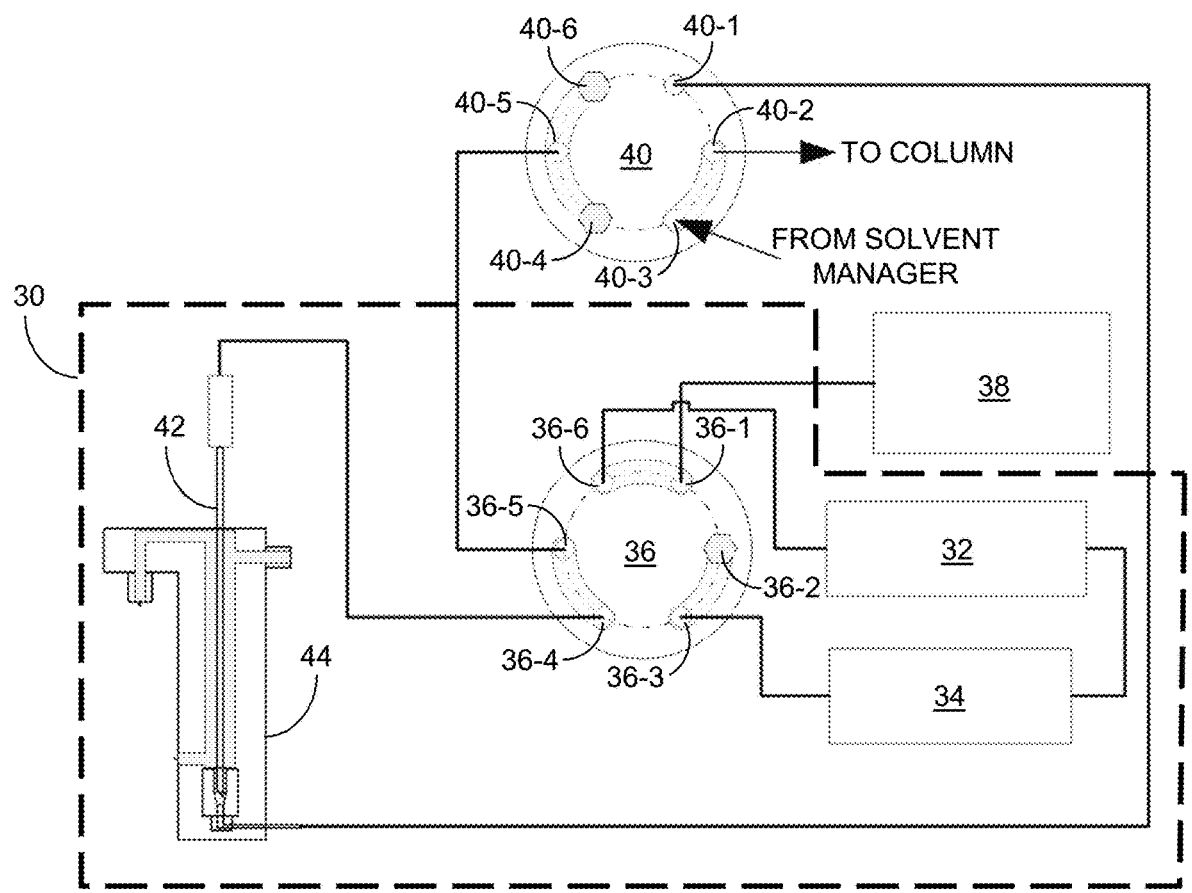
FIG. 2 is a schematic diagram of a portion of a liquid chromatography system that includes an embodiment of an apparatus for diluting a sample.

FIG. 2 is a schematic diagram of a portion of a liquid chromatography system that includes an embodiment of an apparatus 30 for diluting a sample. The apparatus 30 includes components that can be used to replace conventional components used with the sample source 20 and injection valve 24 shown in FIG. 1. The illustrated apparatus 30 includes a metering pump 32, a pressure transducer 34 and a sample valve 36. The apparatus 30 communicates with a flush solvent reservoir 38, an injection and dilution valve (i.e., "merge valve") 40, and a sample needle 42. As used herein, a merge valve means any valve that can be used to inject a discrete fluidic plug of sample into the mobile phase of the liquid chromatography system and to alternatively be used to merge a flow of sample with a concurrent flow of mobile phase in the liquid chromatography system to achieve a dilution of the sample. Besides the apparatus 30, the merge valve 40 is also in communication with a needle and wash port module 44, and a solvent manager and chromatographic column (not shown).

As used herein, a "metering pump" means any pump capable of delivering a precise volume of liquid over a specified time. By way of example, one type of metering pump is a positive displacement pump, such as a single piston pump, that is compatible with chromatographic solvents. The piston pump has a piston chamber and two fluid lines each extending from a pump port to the piston chamber. In a preferred configuration, there are no operable check valves thus each of the fluid lines may function for bi-directional fluid flow, that is, each pump port can function as an inlet or an outlet. Preferably, the metering pump 32 has a displacement volume that is greater than the fluid volumes of any of the fluid paths. Metering pumps may utilize linear actuators capable of operating under high pressures with precise volume control per actuator steps. Other metering pumps may utilize lead-screw and ball-screw actuators for low cost and high reliability. Advantageously, the metering pump 32 can be controlled to acquire and dispense accurate volumes of samples and solvents.

The sample needle 42 may be a Flow-Through Needle (FTN) that is part of a sample manager in the liquid chromatography system. For example, the sample needle 42 may be an ACQUITY I-Class SM-FTN needle assembly available from Waters Corporation of Milford, Mass. The sample needle 42 and wash port module 44 may have ports to receive and dispense a wash solvent used to wash the sample needle 42 when the liquid chromatography system is offline.

Various components in the illustrated fluid circuitry may be utilized to define fluid paths and affect flow rates. In particular, the metering pump 32 may be used to draw or dispense liquid at different flow rates, and the two valves 36 and 40 can be configured in different states such that the active fluid paths are determined by the particular configuration of each valve.

The sample valve 36 operates under high system pressure (e.g., 18,000 psi (125 MPa)) and is operable in at least two states such that a change between states can be used to reconfigure fluid paths within the liquid chromatography system. In some embodiments the sample valve 36 is a six-port rotary shear seal valve. The sample valve 36 has six sample valve ports 36-1 to 36-6 that can be externally coupled to various fluid paths, fluid channels and components in the fluid circuit. Port 36-1 is coupled to the flush solvent reservoir 38, port 36-3 is coupled to the pressure transducer 34, port 36-4 is coupled to the sample needle 42, port 36-5 is coupled to the system merge valve 40 and port 36-6 is coupled to the metering pump 32. Port 36-2 is fluidically terminated, that is, blocked (indicated by hexagonal feature) so that no fluid enters or exits the port. The double arc features in the figure indicate internal fluid paths between valve ports, for example, channels formed in the rotor and/or the stator of a rotary shear seal valve that are used to establish an internal fluid communication between two or more ports. The sample valve 36 is shown in a first (offline) valve state in which ports 36-1 and 36-6 are in internal fluid communication, ports 36-2 and 36-3 are in internal fluid communication and ports 36-4 and 36-5 are in internal fluid communication. The sample valve 30 can be reconfigured to a second (online) valve state in which the internal coupling paths are effectively rotated either clockwise (or counterclockwise) by 60° with respect to those shown in the figure. Thus, when the sample valve 36 is in the second state, port 36-1 is in internal fluid communication with port 36-2, port 36-3 is in internal fluid communication with port 36-4 and port 36-5 is in internal fluid communication with port 36-6.

The merge valve 40 has six merge valve ports 40-1 to 40-6. Ports 40-4 and 40-6 are terminated so that no fluid can enter or exits these ports. Port 40-1 is coupled to the needle and wash port module 44, port 40-2 is coupled to the chromatographic column, ports 40-3 is coupled to a source of mobile phase (e.g., solvent manager 16 in FIG. 1) and port 40-5 is coupled to port 36-5 of the sample valve 36. The merge valve 40 is configurable in at least three valve states. As illustrated, the merge valve 40 is in a first (bypass) valve state in which ports 40-2 and 40-3 are in internal fluid communication with each other so that mobile phase entering at port 40-3 can exit at port 40-2 and flow to the chromatographic column. The merge valve 40 is also configurable in two other valve states, a dilution state and a gradient state, as discussed further below with respect to FIG. 6 and FIG. 7, respectively. Reconfiguration results in an effective rotation in the internal couplings shown by the parallel arc lines extending between certain valve ports.

Both the sample valve 36 and the merge valve 40 are in communication with one or more valve control modules (not shown) and can be configured in their various valve states, for example, by commands sent to the valve control modules. For example, the valves 36 and 40 may be in communication with the control modules through one or more electrical conductors or cables. In some embodiments the control modules may be standalone modules that also communicate with a processor (e.g., see system processor 12 in FIG. 1) and in other embodiments the control modules may be integrated into a processor also used for other processing and/or control functions.

Figure 3:
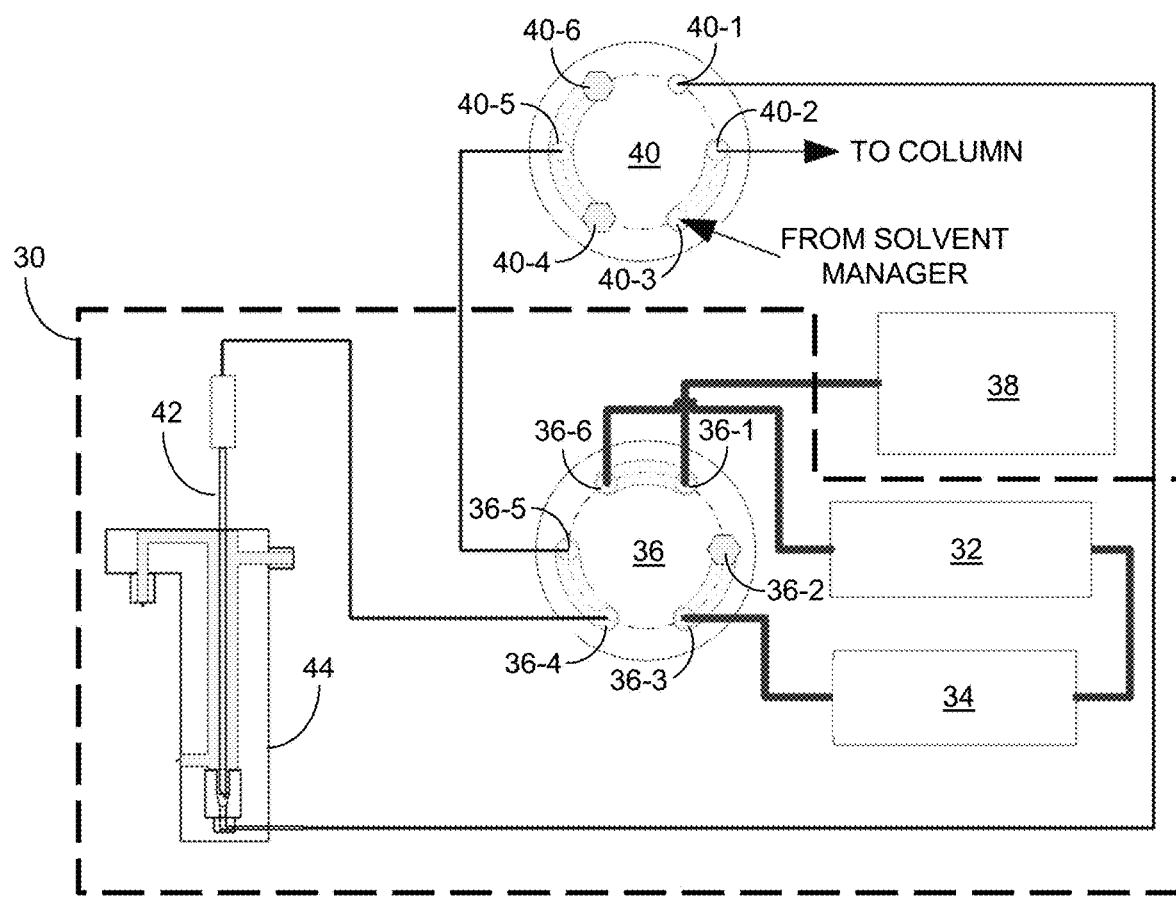
FIG. 3 shows the portion of the liquid chromatography system of FIG. 2 with a sample valve in a first (offline) valve state and a merge valve in a bypass state.

Referring to FIG. 3, a portion of a liquid chromatography system is schematically shown with the sample valve 36 in the first state and the merge valve 40 in the bypass state. Bold lines in FIG. 3 and subsequent figures indicate active fluid paths. A flow of mobile phase passes through the merge valve 40 to the chromatographic column. The metering pump 32 is operated to draw in liquid under atmospheric pressure. As described above, port 36-2 on the sample valve 36 is terminated therefore operation of the metering pump 32 results in flush solvent being aspirated from the flush solvent reservoir 38. The volume of aspirated flush solvent is accurately controlled and pre-fills the metering pump 32 with a volume of flush solvent that is slightly greater that the volume of sample to be injected into the mobile phase. By way of a non-limiting numerical example, a 24 μL volume of flush solvent may be aspirated for a 20 μL volume sample injection.

Figure 4:
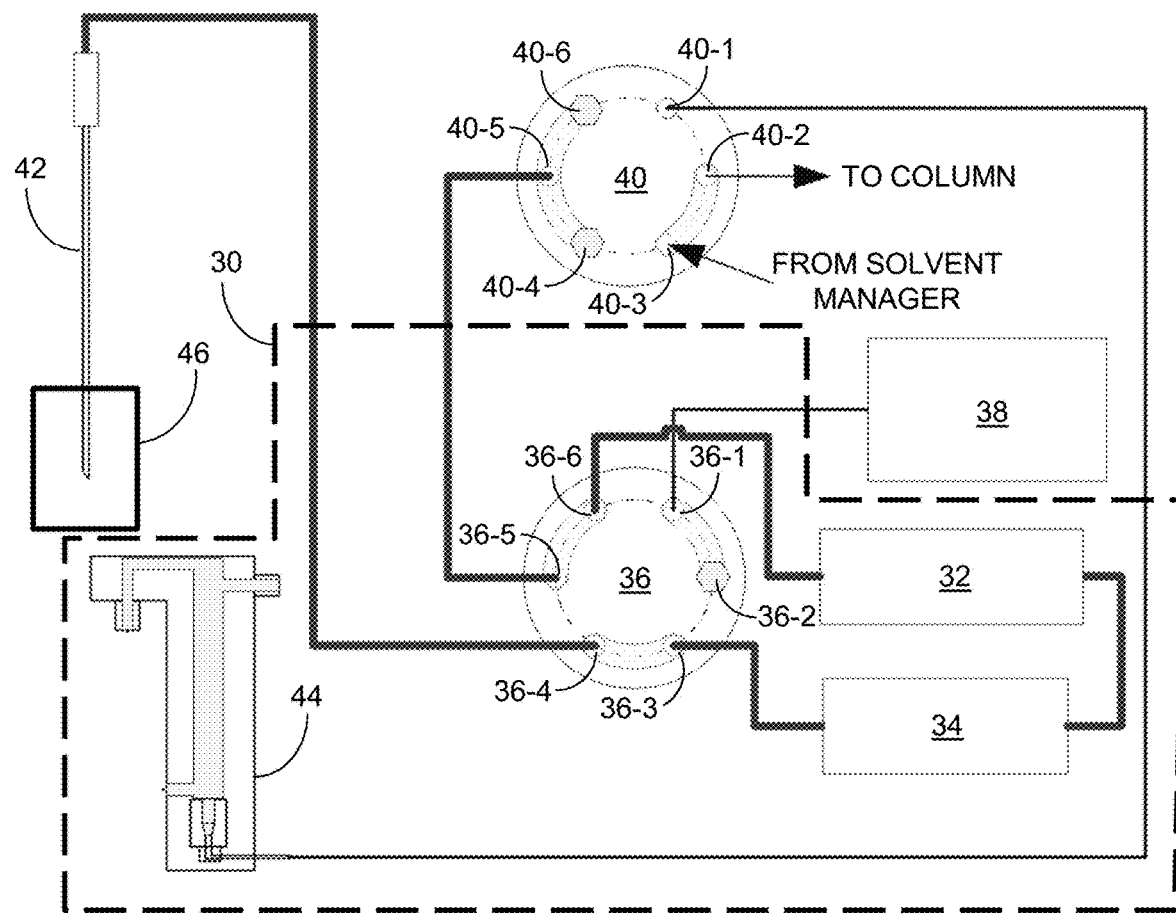
FIG. 4 shows the portion of the liquid chromatography system of FIG. 2 with the sample valve reconfigured to a second (online) valve state.

To load the sample, the sample valve 36 is reconfigured to the second (online) valve state as shown in FIG. 4. Thus the metering pump 32 is terminated at the left side due to the terminations at ports 40-4 and 40-6 of the merge valve 40 and the right side of the metering pump 32 communicates with the sample needle 42. In this configuration, the metering pump 32 is operated to continue to draw in liquid under atmospheric pressure which results in sample being aspirated into the sample needle 42 from a sample vial 46. The volume of aspirated sample is accurately controlled by the operation of the metering pump 32. The extra volume of acquired flush solvent relative to the acquired volume of sample is used to ensure in a later step that the acquired sample is fully pushed through the volume of the fluid path between the acquired solvent in the sample needle 42 and the location of merging with the mobile phase at the merge valve 40, and to accommodate dispersion in the fluid path.

Figure 5:
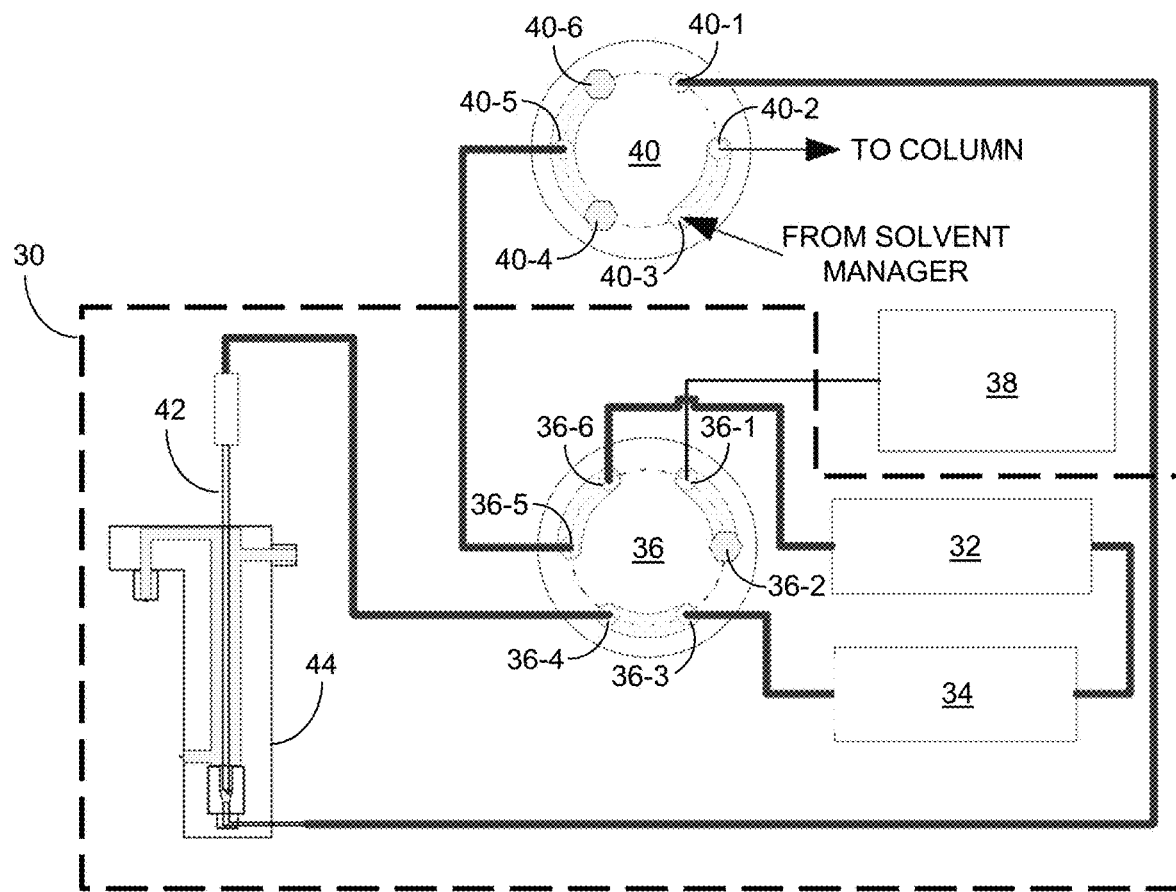
FIG. 5 shows the portion of the liquid chromatography system of FIG. 2 after the sample needle is moved from a sample vial to a needle seal of a needle and wash port module while the valve states of the sample valve and merge valve remain unchanged from FIG. 4.

FIG. 5 shows the portion of the liquid chromatography system after the sample needle 42 is moved from the sample vial to the needle seal of the needle and wash port module 44 while the valve states of the sample valve 36 and merge valve 40 remain unchanged. The fluid path from the left side of the metering pump 32 remains terminated at the merge valve 40 and the fluid path from the right side of the metering pump 32 through the pressure transducer 34, sample valve 36, sample needle 42 and injection and wash port module 44 is also terminated at the merge valve 46 as the valve port 40-1 is not coupled to another valve port. The metering pump 32 is then controlled to push liquid out so that both fluid paths are brought up to the full system pressure. Pressure transducer 34 can be used to confirm that system pressure has been reached.

Figure 6:
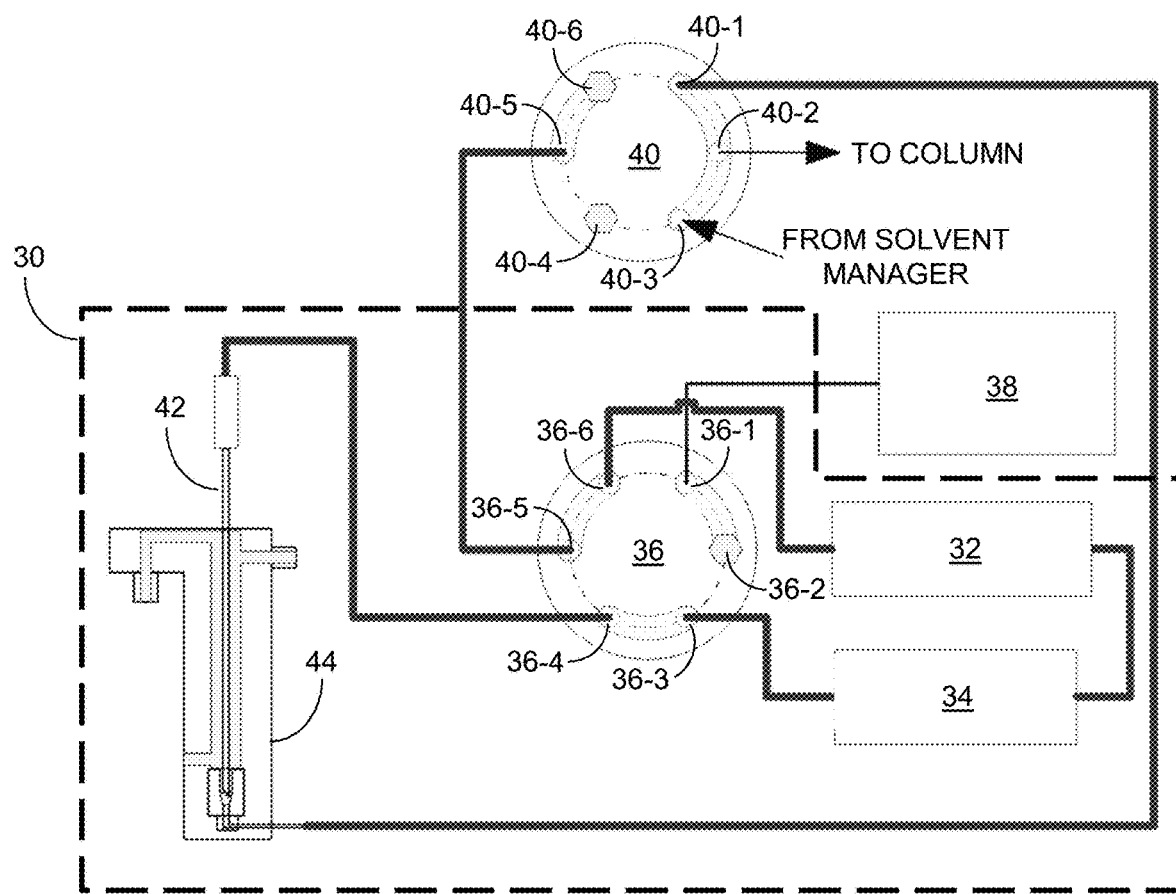
FIG. 6 shows the portion of the liquid chromatography system of FIG. 2 with the merge valve reconfigured to a second (dilution) valve state.

Subsequently, the merge valve 40 is reconfigured to a second (dilution) valve state as shown in FIG. 6. Continued operation of the metering pump 32 to dispense liquid results in the acquired sample flowing from the sample needle 42 through the needle and wash port module 44 and then though port 40-1 of the merge valve 40. A small volume of solvent in the fluid lines is first merged with the flow of mobile phase received at port 40-3 before the sample plug arrives at port 40-3 and is merged with the mobile phase. The sample plug exiting the merge valve 40 at port 40-2 is merged with concurrently flowing mobile phase also exiting at port 40-2. To maintain a constant system flow to the column, the flow rate from the mobile phase source is decreased while the flow rate from the metering pump 32 is increased. As both the flow of mobile phase and the flow of the sample contribute to the system flow throughout the duration of the sample injection and dilution, the sample dilution ratio is determined by the two flow rates during this time. By way of a non-limiting numerical example, if the mobile phase flow rate at port 40-3 is nine times the sample flow rate at port 40-1, the sample concentration in the flow exiting at port 40-2 is effectively one-tenth the original sample strength (i.e., the dilution ratio is one part sample to nine parts diluent (mobile phase)). It will be recognized that a wide range of dilution ratios are possible.

Some of the solvent in the fluid path used to "push" the sample plug is allowed to merge with the mobile phase for a time sufficient to ensure that substantially all the sample has been merged with the mobile phase. Subsequently, the flow rate from the mobile phase source is increased while the flow rate from the metering pump 32 is decreased in a complementary manner to maintain a constant system flow rate to the column. "Substantially all the sample" means that any sample remaining in the illustrated fluid paths is of insignificant volume as to not adversely affect chromatographic results. In some embodiments, the flow rates are not changed until a volume of liquid that is at least twice the volume of the sample has passed through the port 40-1 and merged with the mobile phase to thereby reduce a residual amount of the sample that may have remained in the fluid path prior to entering the merge valve 40.

Figure 7:
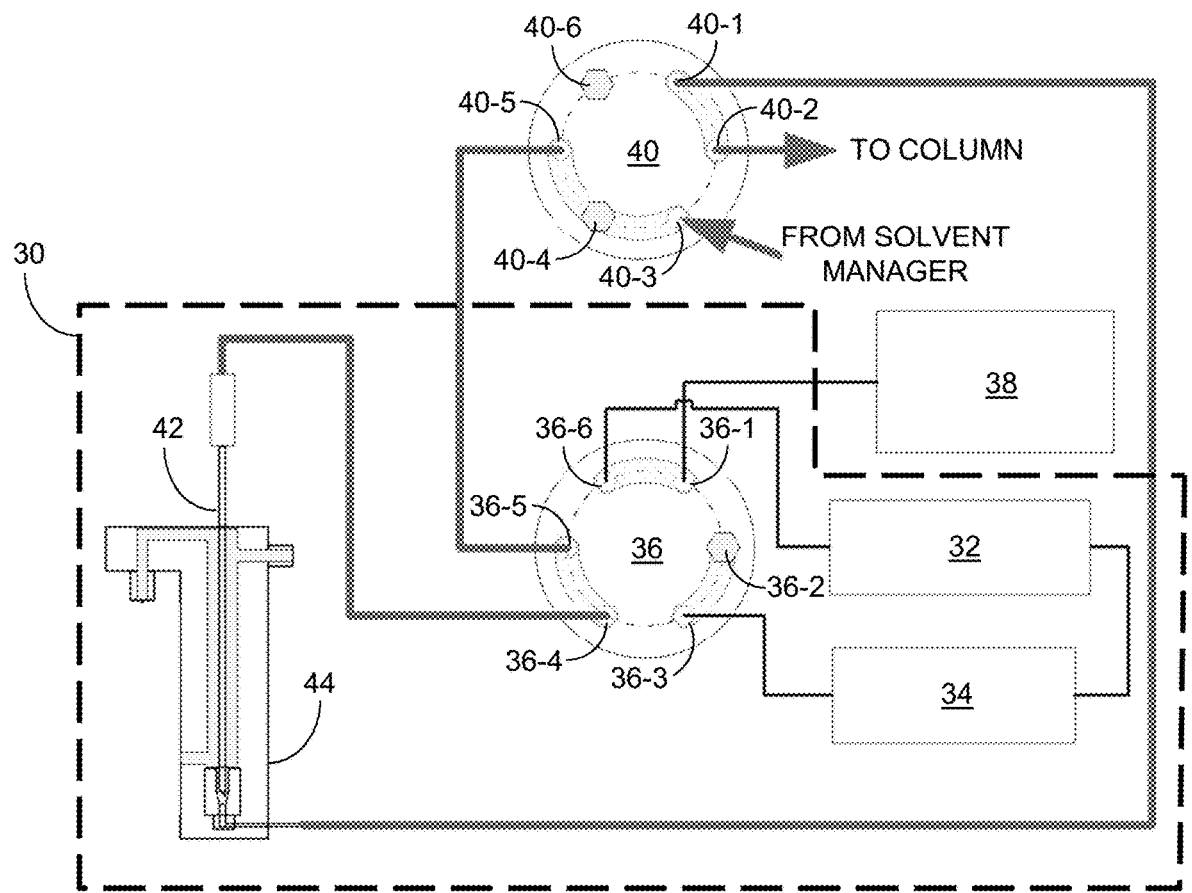
FIG. 7 shows the portion of the liquid chromatography system of FIG. 2 with the sample valve reconfigured to the first valve state and the merge valve reconfigured to a third (gradient) valve state.

Referring to FIG. 7, the sample valve 36 is reconfigured to the first (offline) valve state, thereby disconnecting fluid communication between the metering pump 32 and the sample needle 42. In addition, the merge valve 40 is reconfigured to a third (gradient) valve state such that the mobile phase received at port 40-3 of the merge valve 40 flows out from port 40-5, through the sample valve 36, sample needle 42 and needle and wash port module 44 before returning at port 40-1 and flowing out port 40-2 to the column. The two valves 36 and 40 remain in the illustrated configuration throughout the duration of the gradient chromatographic separation. The fluid path through the inside of the sample needle 42 may be cleaned after completion of the separation by passing the mobile phase through the sample needle 42.

The apparatus 30 can be used with some types of samples to dilute a large volume of the sample during the merging with the mobile phase, including sample volumes that are larger than the displacement volume of the metering pump 32. By way of a non-limiting numerical example, a metering pump having a 100 μL displacement volume can be used to dilute a 1 mL sample volume by consecutively merging smaller volume (e.g., 100 μL or less) sample plugs with the mobile phase. To do this, a smaller volume sample plug is aspirated into the sample needle 42 and subsequently merged into the flow of mobile phase according to the operation of the metering pump 32 and reconfiguration of the sample valve 36 and merge valve 40 described above. This process of merging a smaller volume sample plug with the mobile phase is repeated a number of times so that the total of the volumes of the smaller sample plugs merged into the mobile phase equals to the full sample volume. The effective dilution ratio is determined by the relative flow rates of the mobile phase and the smaller volumes of sample during the merge times.

While the invention has been shown and described with reference to specific preferred embodiments, it should be understood by those skilled in the art that various changes in form and detail may be made therein without departing from the spirit and scope of the invention as defined by the following claims.

What is claimed is:

1. An apparatus for diluting a sample in a liquid chromatography system, comprising:
   a metering pump having a first pump port and a second pump port;
   a sample needle having a fluid channel;
   a sample valve having a plurality of sample valve ports, a first one of the sample valve ports being in fluid communication with the first pump port, a second one of the sample valve ports being in fluid communication with the second pump port, and a third one of the sample valve ports being in fluid communication with the sample needle, the sample valve being operable in one of a first state and a second state, wherein, when the sample valve is in the first state, the sample valve is configured to conduct a solvent to the first pump port and to fluidically terminate the second pump port, and wherein, when the sample valve is in the second state, the second one of the sample valve ports is in fluid communication with the third one of the sample valve ports so that the sample needle is in fluid communication with the second pump port; and
   a merge valve in fluid communication with the sample valve, the merge valve having a plurality of merge valve ports and being operable in one of a first state and a second state, a first one of the merge valve ports configured to receive a flow of mobile phase and a second one of the merge valve ports being in fluid communication with a chromatographic column, wherein, when the merge valve is in the first state, the first one of the merge valve ports is in fluid communication with a second one of the merge valve ports and wherein, when the merge valve is in the second state, the first one of the merge valve ports is in fluid communication with the second one of the merge valve ports and a third one of the merge valve ports.

2. The apparatus of claim 1 wherein the metering pump is a positive displacement pump.

3. The apparatus of claim 1 wherein the sample valve is a rotary shear seal valve.

4. The apparatus of claim 1 further comprising a solvent reservoir in fluid communication with one of the sample valve ports.

5. The apparatus of claim 1 further comprising a pressure transducer disposed in a fluid path between the second pump port and the second one of the sample valve ports.

6. The apparatus of claim 1 further comprising a valve control module in communication with the sample valve.

7. The apparatus of claim 1 wherein the sample valve has at least six sample valve ports.

8. The apparatus of claim 7 wherein, when the sample valve is in the first state, a first sample valve port is in internal fluid communication with a sixth sample valve port, a second sample valve port is in internal fluid communication with a third sample valve port and a fourth sample valve port is in internal fluid communication with a fifth sample valve port, and wherein, when the sample valve is in the second state, the first sample valve port is in internal fluid communication with the second sample valve port, the third sample valve port is in internal fluid communication with the fourth sample valve port and the fifth sample valve port is in internal fluid communication with the sixth sample valve port.

9. The apparatus of claim 1 further comprising at least one valve control module in communication with the sample valve and the merge valve.

10. The apparatus of claim 1 wherein the merge valve has at least six merge valve ports.

11. The apparatus of claim 10 wherein, when the merge valve is in the first state, a second merge valve port is in internal fluid communication with a third merge valve port, and a fourth merge valve port, a fifth merge valve port and a sixth merge valve port are in internal fluid communication with each other, and wherein, when the merge valve is in the second state, a first merge valve port, the second merge valve port and the third merge valve port are in internal fluid communication with each other and the fifth merge valve port is in internal fluid communication with the sixth merge valve port.

12. The apparatus of claim 11 wherein the merge valve is operable in a third state wherein, when the merge valve is in the third state, the first merge valve port is in internal fluid communication with the second merge valve port, and the third merge valve port, the fourth merge valve port and the fifth merge valve port are in internal fluid communication with each other.

13. A chromatography system for online sample dilution, comprising:
   a metering pump having a first pump port and a second pump port;
   a pressure transducer in fluid communication with the second pump port of the metering pump;
   a sample needle having a fluid channel;
   a solvent reservoir;
   a chromatographic column;
   a sample valve having a plurality of sample valve ports, a first one of the sample valve ports being in fluid communication with the first pump port, a second one of the sample valve ports being in fluid communication with the pressure transducer, and a third one of the sample valve ports being in fluid communication with the sample needle, the sample valve being operable in one of a first state and a second state, wherein, when the sample valve is in the first state, the sample valve is configured to conduct a solvent to the first pump port and to fluidically terminate the second pump port, and wherein, when the sample valve is in the second state, the second one of the sample valve ports is in fluid communication with the third one of the sample valve ports so that the sample needle is in fluid communication with the second pump port through the pressure transducer; and
   a merge valve in fluid communication with the sample valve, the merge valve having a plurality of merge valve ports and being operable in one of a first state and a second state, a first one of the merge valve ports configured to receive a flow of mobile phase and a second one of the merge valve ports being in fluid communication with the chromatographic column, wherein, when the merge valve is in the first state, the first one of the merge valve ports is in fluid communication with a second one of the merge valve ports and wherein, when the merge valve is in the second state, the first one of the merge valve ports is in fluid communication with the second one of the merge valve ports and a third one of the merge valve ports.

\* \* \* \* \*